(12) United States Patent
Richie

(10) Patent No.: US 7,934,339 B2
(45) Date of Patent: May 3, 2011

(54) FISHING LURE

(76) Inventor: Linton Lowell Richie, Upper Marlboro, MD (US)

( * ) Notice: Subject to any disclaimer, the term of this patent is extended or adjusted under 35 U.S.C. 154(b) by 80 days.

(21) Appl. No.: 12/270,953

(22) Filed: Nov. 14, 2008

(65) Prior Publication Data

US 2009/0217566 A1    Sep. 3, 2009

Related U.S. Application Data

(60) Provisional application No. 61/032,105, filed on Feb. 28, 2008.

(51) Int. Cl.
*A01K 85/00* (2006.01)
*A01K 85/01* (2006.01)

(52) U.S. Cl. .................. 43/42.33; 43/42.32; 43/17.6

(58) Field of Classification Search .............. 43/17.6, 43/17.5, 42.09, 42.32, 42.33, 42.34
See application file for complete search history.

(56) References Cited

U.S. PATENT DOCUMENTS

| | | | | |
|---|---|---|---|---|
| 1,067,178 A * | 7/1913 | Lambert | | 43/42.34 |
| 1,207,588 A * | 12/1916 | Maus | | 43/42.09 |
| 1,380,876 A * | 6/1921 | Warden | | 43/17.6 |
| 1,723,557 A * | 8/1929 | Ono | | 43/42.34 |
| 1,832,743 A * | 11/1931 | Shuldiner | | 446/392 |
| 1,967,692 A * | 7/1934 | Walker | | 43/42.32 |
| 2,149,464 A * | 3/1939 | Potts | | 43/42.33 |
| 2,303,097 A * | 11/1942 | Townsend et al. | | 43/42.34 |
| 2,477,460 A * | 7/1949 | Larson | | 43/42.34 |
| 2,517,495 A * | 8/1950 | Kneece | | 43/26.2 |
| 2,528,083 A * | 10/1950 | Ruff | | 43/17.6 |
| 2,641,080 A * | 6/1953 | Wise | | 43/42.33 |
| 2,650,450 A * | 9/1953 | Grathwohl | | 43/42.32 |
| 2,665,511 A * | 1/1954 | Bradberry | | 43/42.33 |
| 2,691,839 A * | 10/1954 | Duerig | | 43/17.6 |
| 2,708,806 A * | 5/1955 | Siebert | | 43/42.33 |
| 2,765,572 A * | 10/1956 | Woolfe | | 43/42.34 |
| 2,912,783 A * | 11/1959 | Marks | | 43/42.32 |
| 2,939,240 A * | 6/1960 | Goodman | | 43/17.6 |
| 2,955,375 A * | 10/1960 | Mitchell | | 43/17.6 |
| 3,021,636 A * | 2/1962 | Gowdy | | 43/42.34 |
| 3,343,296 A * | 9/1967 | Davis | | 43/42.34 |
| 3,393,465 A * | 7/1968 | Powell | | 43/17.6 |
| 3,690,028 A * | 9/1972 | Walker et al. | | 43/17.6 |
| 3,708,903 A * | 1/1973 | Bercz et al. | | 43/17.6 |
| 3,724,117 A * | 4/1973 | Flanagan, Jr. | | 43/42.32 |
| 3,762,092 A * | 10/1973 | Bercz et al. | | 43/17.6 |
| 3,769,738 A * | 11/1973 | Begley | | 43/42.26 |
| 3,855,722 A * | 12/1974 | Moore | | 43/42.34 |

(Continued)

FOREIGN PATENT DOCUMENTS

FR    2569947 A1 *  3/1986

(Continued)

*Primary Examiner* — Darren W Ark
(74) *Attorney, Agent, or Firm* — John T. Whelan

(57) ABSTRACT

A fishing lure having a head portion with a first side and a second side. A first eye socket is positioned on the first side of the head portion and a second eye socket is positioned on the second side of the head portion. Each of the first and second eye sockets is substantially semi-spherical shape and each of said first and second eye sockets is coated with a fluorescent substance of substantially uniform application. A first eye component is fixedly secured in at least a portion of the first eye socket and a second eye component is fixedly secured in at least a portion of the second eye socket. Each of the first and second eye components comprise a transparent, substantially spherical material.

1 Claim, 1 Drawing Sheet

U.S. PATENT DOCUMENTS

| | | | | |
|---|---|---|---|---|
| 3,881,272 A | * | 5/1975 | Parker | 43/42.34 |
| 3,895,455 A | * | 7/1975 | Johnston | 43/17.6 |
| 3,936,970 A | * | 2/1976 | Hodges | 43/17.6 |
| 3,952,445 A | * | 4/1976 | Liebert | 43/42.34 |
| 4,045,903 A | * | 9/1977 | Parker | 43/42.09 |
| 4,227,331 A | * | 10/1980 | Ursrey et al. | 43/17.6 |
| 4,637,159 A | * | 1/1987 | Kulis | 43/42.32 |
| 4,638,584 A | * | 1/1987 | Lindsay | 43/17.6 |
| 4,663,880 A | * | 5/1987 | Grobl | 43/17.6 |
| 4,669,213 A | * | 6/1987 | LeRoy | 43/17.6 |
| 4,727,674 A | * | 3/1988 | Garr | 43/17.6 |
| 4,733,491 A | * | 3/1988 | Wilson et al. | 43/42.33 |
| 4,741,120 A | * | 5/1988 | Cota et al. | 43/17.6 |
| 4,757,632 A | * | 7/1988 | Grobl | 43/17.6 |
| 4,773,181 A | * | 9/1988 | Radden | 43/42.37 |
| 4,785,569 A | * | 11/1988 | Thomas, Jr. | 43/42.31 |
| 4,799,327 A | * | 1/1989 | Treon | 43/17.6 |
| 4,807,383 A | * | 2/1989 | Delwiche | 43/17.5 |
| 4,811,513 A | * | 3/1989 | Grobl | 43/17.6 |
| 4,888,905 A | * | 12/1989 | Garr | 43/17.6 |
| 4,972,623 A | * | 11/1990 | Delricco | 43/17.6 |
| 5,063,703 A | * | 11/1991 | Riley | 43/42.06 |
| 5,148,622 A | * | 9/1992 | Blair | 43/42.32 |
| 5,203,105 A | * | 4/1993 | Bond et al. | 43/42.39 |
| 5,209,007 A | * | 5/1993 | Southerland, Jr. | 43/42.09 |
| 5,245,783 A | * | 9/1993 | Cumiskey | 43/42.37 |
| 5,349,776 A | * | 9/1994 | Lucas | 43/42.39 |
| 5,392,555 A | * | 2/1995 | Tingey | 43/17.6 |
| 5,456,040 A | * | 10/1995 | Dickens | 43/42.34 |
| 5,465,524 A | * | 11/1995 | Vallone et al. | 43/17.6 |
| 5,560,142 A | * | 10/1996 | Dickens | 43/42.34 |
| 5,564,220 A | * | 10/1996 | Blicha | 43/42.32 |
| 5,586,405 A | * | 12/1996 | Fike | 43/42.31 |
| 5,588,246 A | * | 12/1996 | Hill | 43/42.34 |
| 5,647,163 A | * | 7/1997 | Gorney | 43/42.32 |
| 5,697,182 A | * | 12/1997 | Rodgers | 43/17.6 |
| 5,903,999 A | * | 5/1999 | Petras | 43/17.6 |
| 5,918,405 A | * | 7/1999 | Marusak et al. | 43/42.34 |
| 6,029,388 A | * | 2/2000 | Yokogawa et al. | 43/17.6 |
| 6,052,938 A | * | 4/2000 | Marusak et al. | 43/42.34 |
| 6,058,643 A | * | 5/2000 | Marusak et al. | 43/42.34 |
| 6,079,146 A | * | 6/2000 | Larsen | 43/42.06 |
| 6,131,329 A | * | 10/2000 | Kageyama | 43/42.33 |
| 6,141,900 A | * | 11/2000 | Rudolph | 43/42.24 |
| 6,301,823 B1 | * | 10/2001 | Monticello et al. | 43/42.33 |
| 6,318,016 B1 | * | 11/2001 | Ellig | 43/17.6 |
| 6,606,815 B1 | * | 8/2003 | Toris | 43/42.33 |
| 6,922,935 B2 | * | 8/2005 | Yu | 43/17.6 |
| 7,216,455 B2 | * | 5/2007 | Becker | 43/42.37 |
| 7,260,913 B2 | * | 8/2007 | Becker | 43/17.6 |
| 7,520,085 B2 | * | 4/2009 | Edwards et al. | 43/17.6 |
| 2009/0277071 A1 | * | 11/2009 | Harris, Jr. | 43/42.32 |
| 2011/0010983 A1 | * | 1/2011 | Briccetti et al. | 43/17.6 |

FOREIGN PATENT DOCUMENTS

| | | | | |
|---|---|---|---|---|
| JP | 09154439 A | * | 6/1997 | |
| JP | 11196714 A | * | 7/1999 | |
| JP | 11243812 A | * | 9/1999 | |
| JP | 2000083512 A | * | 3/2000 | |
| JP | 2000093046 A | * | 4/2000 | |
| JP | 2000197431 A | * | 7/2000 | |
| JP | 2001231407 A | * | 8/2001 | |
| JP | 2002027868 A | * | 1/2002 | |
| JP | 2004283166 A | * | 10/2004 | |
| JP | 2005130842 A | * | 5/2005 | |
| JP | 2009082117 A | * | 4/2009 | |
| WO | WO 9950915 A1 | * | 10/1999 | |

* cited by examiner

FISHING LURE

CROSS REFERENCE TO RELATED APPLICATION

This application claims priority under 35 U.S.C. § 119(e) from U.S. Provisional Patent Application No. 61/032,105, filed Feb. 28, 2008, the entire contents of which are incorporated herein by reference.

BACKGROUND

Fishing lures, such as bucktails, plugs, crankbaits, and the like, which have eyes positioned on a lure head are known in the art. Such lures, when passed through the water either by casting/retrieving or trolling, are intended to give the appearance of a bait fish and thus induce a target fish to attempt to eat the lure, thus hooking the target fish. As any sportsman knows, however, fish are finicky creatures and anglers are always searching for better lures that are more lifelike to better induce the fish to strike the lure.

SUMMARY

The present invention is directed to a novel and unobvious combination of elements resulting in an improved fishing lure. More specifically, a fishing lure having a head portion having a first side and a second side is disclosed and claimed. A first eye socket is positioned on the first side of the head portion and a second eye socket is positioned on the second side of the head portion. Each of the first and second eye sockets is substantially semi-spherical shape and each of said first and second eye sockets is coated with a fluorescent substance of substantially uniform application. A first eye component is fixedly secured in at least a portion of the first eye socket and a second eye component is fixedly secured in at least a portion of the second eye socket. Each of the first and second eye components comprise a transparent, substantially spherical material.

DESCRIPTION OF THE FIGURES

The accompanying drawings, which are incorporated in and form a part of the specification, illustrate an exemplary embodiment of the present invention and, together with the description, serve to explain the principles of the invention. In the drawings.

DESCRIPTION OF THE PRESENT INVENTION

An exemplary fishing lure 100 in accordance with the present invention will now be described with reference to FIGS. 1 and 2.

Figure 1:
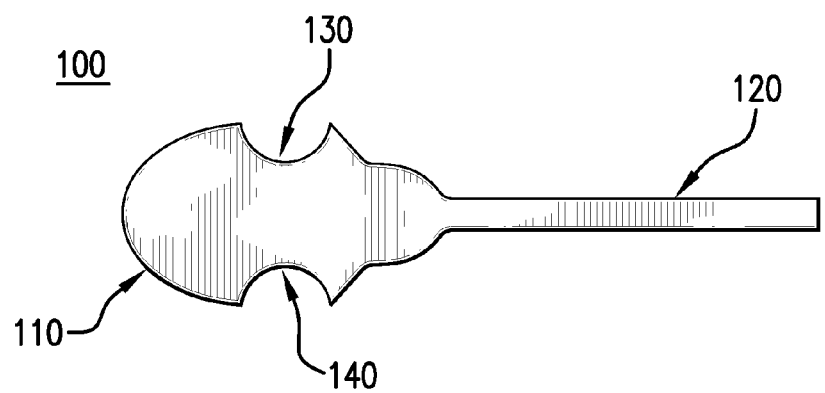
FIG. 1 is a top view of a lure of the present invention with the eye components removed; and a preferred embodiment of the present invention.
Figure 2:
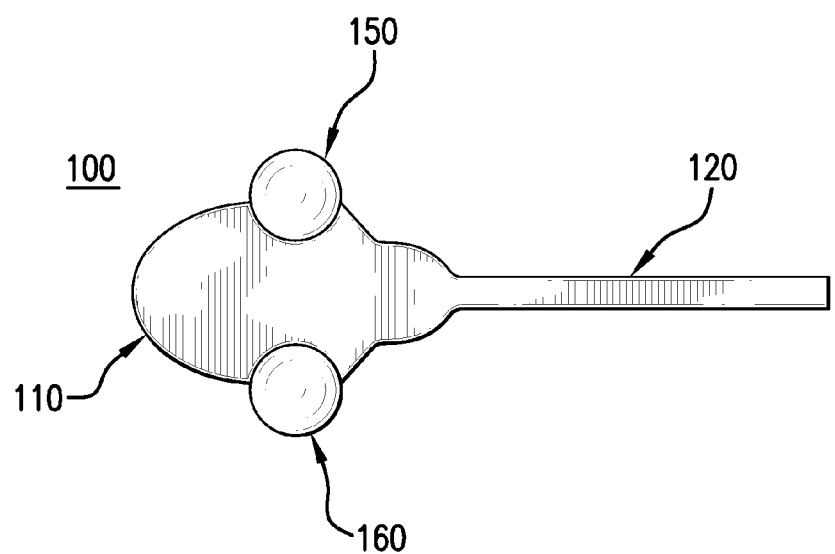
FIG. 2 is a top view of a lure of the present invention with the eye components present.

As shown in the top-down views of FIGS. 1 and 2, the present invention is directed to an improved fishing lure 100, such as a bucktail, crankbait, or the like. More particularly, the present invention is directed to a fishing lure 100 comprising a head portion 110 and a hook portion 120. The head portion 110, which is preferably made of lead, plastic, or other rigid or semi-rigid material, is configured to have a pair of recessed eye sockets (i.e., a first eye socket 130 and a second eye socket 140) formed in head portion 110. The first and second eye sockets 130, 140 are preferably spherical in shape configured and positioned on opposing sides of head 110, to mimic the approximate size and position of eyes on a bait fish. The diameter and depth of each of the eye sockets 130, 140 are preferably the same and are selected so that first and second eye components 150, 160, such as plastic or glass marbles or the like, may be fixedly inserted into first and second eye sockets 130, 140 with approximately one half (+/−20%) of each eye component 150, 160 being received by and extending into each eye socket 130, 140, while the other half (−/+20%) of each eye component 150, 160 extends outward from the lure head 110, thus giving the appearance of (bulging) eyes. Of course, in addition to or in lieu of plastic or glass marbles, other transparent spherical materials also may be used as the eye components 150, 160, as will be apparent to those skilled in the art.

In accordance with a preferred embodiment of the present invention, the first and second eye sockets 130, 140 are coated with a fluorescent paint or the like (preferably of uniform color) before the eye components 150, 160 are fixedly inserted into the sockets. More specifically, the inventor of the present invention has determined that by coating the recessed sockets 130, 140 with a fluorescent substance, such as paint, dye, stain, or the like, and then fixedly securing transparent eye components 150, 160 into the eye sockets 130, 140, a number of advantages are realized.

First, when the lure 100 of the present invention is viewed from a direct top-down, bottom-up, head-on, or tail-on perspective, only the protruding portion of each eye component 150, 160 is seen, while the fluorescent coating in the eye sockets 130, 140 is not seen. Because the eye components 150, 160 themselves comprise a clear, transparent material, each eye component 150, 160 will thus appear to the viewer (presumably a fish) as clear or colorless. Alternatively, when the lure 100 is viewed from either side, the fluorescent coating on one of the eye sockets 130, 140 (that is, the eye socket 130 or 140 on the side of the lure head 110 being viewed) is seen through the transparent eye component. Because the eye socket 130 or 140 is coated with a fluorescent coating, the color of the fluorescent coating is seen by the fish through the transparent eye component 130 or 140. When this occurs, the entire transparent eye component adopts the color of the fluorescent coating. As the lure 100 moves through the water when being trolled or retrieved, the aspect angle at which the lure is viewed varies. Accordingly, when any portion of the fluorescent coating of an eye socket 130, 140 is visible to the fish, the entire eye component 150, 160 associated with that eye socket adopts the color of the fluorescent coating. At other times, the aspect angle will be such that none of the fluorescent coating is visible to the fish and the eye components 150, 160 will thus appear colorless. In this manner, the lure 100 of the present invention gives the appearance of "blinking" when in use.

The above configuration produces exciting results to the angler using the improved fishing lure 100 of the present invention. Given the dynamic environment at hand, that is, a lure being trolled or retrieved by the angler, the current of the water affecting the motion and orientation of the lure, the ever-changing position of a swimming target fish in relation to the lure, etc., the angle from which the target fish views the eye components 150, 160 (and thus eye sockets 130, 140) of the lure 100 is constantly shifting. As a result, the amount of fluorescent eye socket paint viewed by the target fish constantly changes as well. The result is a uniquely conspicuous and productive lure 100 that comprises a significant advancement in the art.

During manufacture, preferably the fluorescent substance (for example, paint) applied to the inside of each eye socket 130, 140 is permitted to fully dry before securing the eye components in the sockets. The eye components 150, 160 may be secured in the sockets 130, 140 using any of a plurality of known adhesives, such as epoxies sold under the brand name "Flex Coat" and the like. The adhesives must be tolerant of salt, sun, and water, be clear, UV rated, and must not cloud the eye components or dilute or otherwise adversely react with the eye socket coating.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The exemplary embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A fishing lure comprising:
    a head portion, said head portion comprising a rigid material, a first side, and a second side;
    a first eye socket positioned on said first side of said head portion and a second eye socket positioned on said second side of said head portion, each of said first and second eye sockets being of a substantially semi-spherical shape and wherein at least a portion of each of said first and second eye sockets is coated with a fluorescent substance of substantially uniform application; and
    a first eye component fixedly secured in said first eye socket and a second eye component fixedly secured in said second eye socket, wherein each of said first and second eye components comprise a transparent, substantially spherical material.

* * * * *